US008079635B2

(12) United States Patent
DeVor et al.

(10) Patent No.: US 8,079,635 B2
(45) Date of Patent: Dec. 20, 2011

(54) DEFORMABLE CROSS-CAR BEAM SYSTEM FOR SIDE IMPACT PROTECTION

(75) Inventors: Michael DeVor, Bloomfield Heights, MI (US); Paul Elio, Phoenix, AZ (US); Frank Gabbianelli, Birmingham, MI (US); Robert Glaspie, Phoenix, AZ (US); Hari Sankara Iyer, Scottsdale, AZ (US); Edward Kustrzyk, Royal Oak, MI (US); Azhagu Nachimuthu Sennimalai Subramanian, Rochester Hills, MI (US); Bogoljub Velanovich, West Bloomfield, MI (US); Frank Varansano, San Diego, CA (US); Jerrold Lavine, Farmington Hill, MI (US)

(73) Assignee: Next Autoworks Company, San Diego, CA (US)

( * ) Notice: Subject to any disclaimer, the term of this patent is extended or adjusted under 35 U.S.C. 154(b) by 0 days.

(21) Appl. No.: 12/732,033

(22) Filed: Mar. 25, 2010

(65) Prior Publication Data

US 2010/0295335 A1 Nov. 25, 2010

Related U.S. Application Data

(60) Provisional application No. 61/163,375, filed on Mar. 25, 2009.

(51) Int. Cl.
*B62D 25/20* (2006.01)

(52) U.S. Cl. .............................. 296/187.08; 296/187.12

(58) Field of Classification Search ................. 296/68.1, 296/187.03, 187.05, 187.08, 187.12, 193.02, 296/193.07; 280/748
See application file for complete search history.

(56) References Cited

U.S. PATENT DOCUMENTS

| | | | | |
|---|---|---|---|---|
| 4,402,545 | A * | 9/1983 | Utsunomiya et al. | 296/204 |
| 6,382,710 | B1 * | 5/2002 | Funk et al. | 296/187.12 |
| 6,994,350 | B2 * | 2/2006 | Krajewski et al. | 296/187.03 |
| 7,581,781 | B2 * | 9/2009 | Brunner et al. | 296/187.03 |
| 2001/0019216 | A1 | 9/2001 | Kobayashi | |
| 2006/0202513 | A1 | 9/2006 | Matsuda | |
| 2007/0152474 | A1 | 7/2007 | Lassl et al. | |

OTHER PUBLICATIONS

PCT/US2010/028750—Search Report, May 20, 2010.

* cited by examiner

*Primary Examiner* — Dennis Pedder
*Assistant Examiner* — Jason S Daniels
(74) *Attorney, Agent, or Firm* — Orrick, Herrington & Sutcliffe LLP

(57) ABSTRACT

Systems and methods that facilitate vehicle passenger protection during side impact events and, more particularly, to systems and methods which increase the survival space between the vehicle side structure and a vehicle passenger located in the vehicle passenger compartment while maintaining reasonable vehicle structure deceleration levels. The systems and methods enable the seat structure assemblies to move inboard during side impact events by coupling the seat structure assemblies to a deformable cross bar or beam. The embodiments include a deformable cross-car beam that is deformable in one or more locations along its length using changes in geometry and/or changes in material to initiate controlled deformation under a cross-car load due to a side impact event.

6 Claims, 10 Drawing Sheets

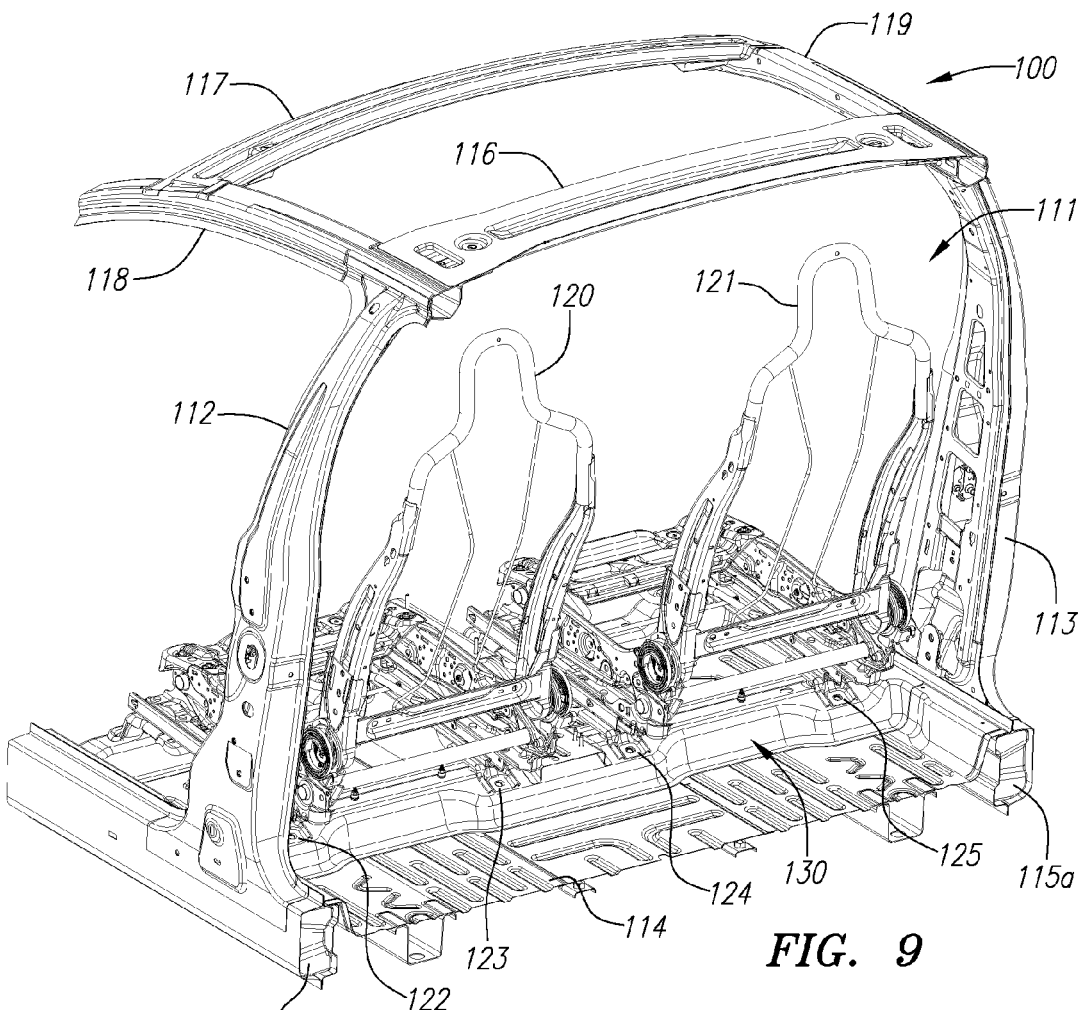
FIG. 9
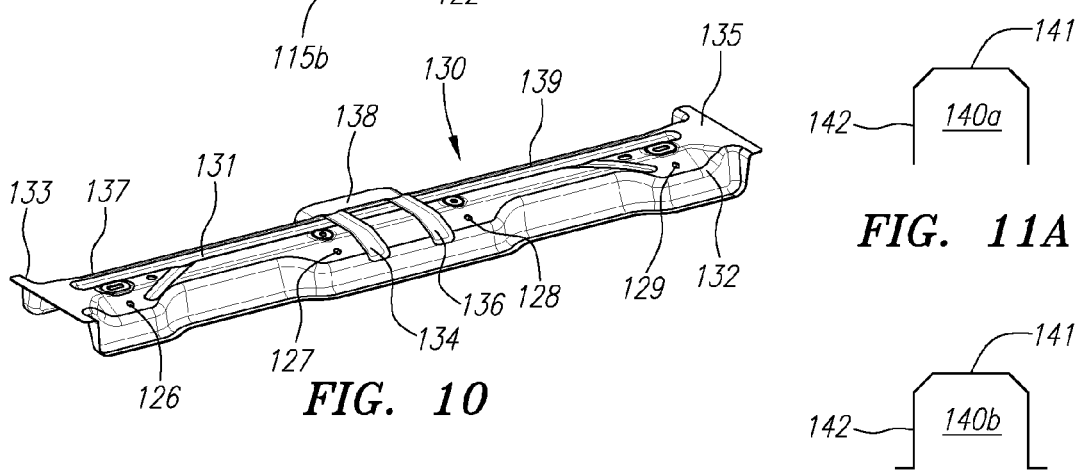
FIG. 10
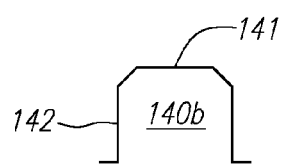
FIG. 11A
FIG. 11B

DEFORMABLE CROSS-CAR BEAM SYSTEM FOR SIDE IMPACT PROTECTION

CROSS-REFERENCE TO RELATED APPLICATION

This application claims the benefit of provisional application Ser. No. 61/163,375 filed Mar. 25, 2009, which is fully incorporated herein.

FIELD

The present invention relates generally to side impact protection systems and methods for automobiles or other vehicles and, more particularly, to systems and methods utilizing a cross-car beam extending between side structures that is deformable to facilitate passenger protection during vehicle side impact collisions.

BACKGROUND

The automotive industry has taken significant steps over the years to increase vehicle safety and crash worthiness. A substantial focus of these efforts has been on the passenger compartment and improving its integrity during a crash. In more recent years, automotive manufacturers have concentrated on addressing the effect of a side impact collision on the passenger compartment. Safety standards have also been adopted requiring automotive manufactures to implement a dynamic side impact protection system or apparatus for maintaining the integrity of the vehicle passenger compartment in response to side impact collisions by laterally interconnecting the sides of the vehicle. One implementation of such standard is described in U.S. Pat. No. 5,954,390 as including a cross-car beam extending laterally within the passenger compartment between vertically extending side structures on opposing sides of the passenger compartment. The intent of the cross-car beam in the '390 patent is to increase the lateral strength of the vehicle.

However, even in systems designed to maintain the integrity of the vehicle passenger compartment in response to side impact collisions, a side impact event will cause intrusion of the vehicle's side structure towards a passenger located in the passenger compartment while accelerating the passenger outboard towards the deforming structure tending to cause serious injuries to the passenger.

Therefore, systems and methods that facilitate an increased gap between the vehicle structure and the passenger during a side impact event and, thus, providing an additional level of safety for the passenger, are desirable.

SUMMARY

The various embodiments and examples provided herein are generally directed to systems and methods that facilitate vehicle passenger protection during side impact events and, more particularly, to systems and methods which increase the survival space between the vehicle side structure and a vehicle passenger located in the vehicle passenger compartment while maintaining reasonable vehicle structure deceleration levels. The systems and methods enable the seat structure assemblies to move inboard during side impact events by coupling the seat structure assemblies to a deformable cross bar or beam. In one embodiment, a deformable cross bar assembly includes first and second co-extensive rigid side portions and a deformable co-extensive central portion or "crush-can" portion coupled between the side portions. The deformable cross bar assembly is joined to the vehicle side structures. The deformable center portion is designed to deform at axial cross car impact forces or loads that are sustainable without deformation by the side portions.

In another embodiment, a deformable cross-car beam includes multiple tunable deformation zones along its length using changes in surface geometry and/or changes in material to initiate controlled deformation under a axial cross car impact force or load.

Other systems, methods, features and advantages of the invention will be or will become apparent to one with skill in the art upon examination of the following figures and detailed description.

BRIEF DESCRIPTION OF THE DRAWINGS

FIG. 9 is a rear perspective view of another embodiment of a partial vehicle body structure with a deformable cross-car beam system for side impact protection.

FIG. 10 is a perspective view of a deformable cross-car beam shown in FIG. 9.

FIGS. 11A and 11B are plan views of cross-sectional profile shapes of the deformable cross-car beam shown in FIGS. 10 and 11.

DESCRIPTION

The various embodiments and examples provided herein are generally directed to a deformable cross-car beam system for side impact protection and more particularly to a system which increases the survival space between the vehicle side structure and a vehicle passenger located in the vehicle passenger compartment while maintaining reasonable vehicle deceleration levels. Side impact events tend to cause intrusion of the vehicle's side structure towards a passenger located in the passenger compartment while accelerating the passenger outboard towards the deforming structure causing serious injuries to the passenger. Therefore, decoupling the passenger's deceleration from the intruding vehicle structure will allow for an increased gap between the vehicle structure and the passenger, providing an additional level of safety for the passenger. The embodiments described herein accomplish this decoupling by attaching the rear of the seat structure assemblies to a cross-car beam that is deformable at one or more locations along its length under an axial cross-car impact force or load.

Although there are other concepts employed in vehicles today to protect against side impact collisions (see, e.g., U.S. Pat. No. 5,954,390), conventional cross-car beams perform a different function in passenger safety. Conventional cross-car beams serve as reinforcing members between opposing "B" pillars or side structures, increasing the axial stiffness of the vehicle. The function of the deformable cross-car beams of the embodiments provided herein is completely different. The purpose of the deformable cross-car beams described herein is to increase the survival space between the vehicle side structure and the passenger while maintaining reasonable vehicle deceleration and intrusion levels. This is achieved by deforming the cross-car beam at one or more locations along its length, allowing for the decoupling of the reinforcement feature from the motion of the occupant away from the deforming side structure.

Figure 1:
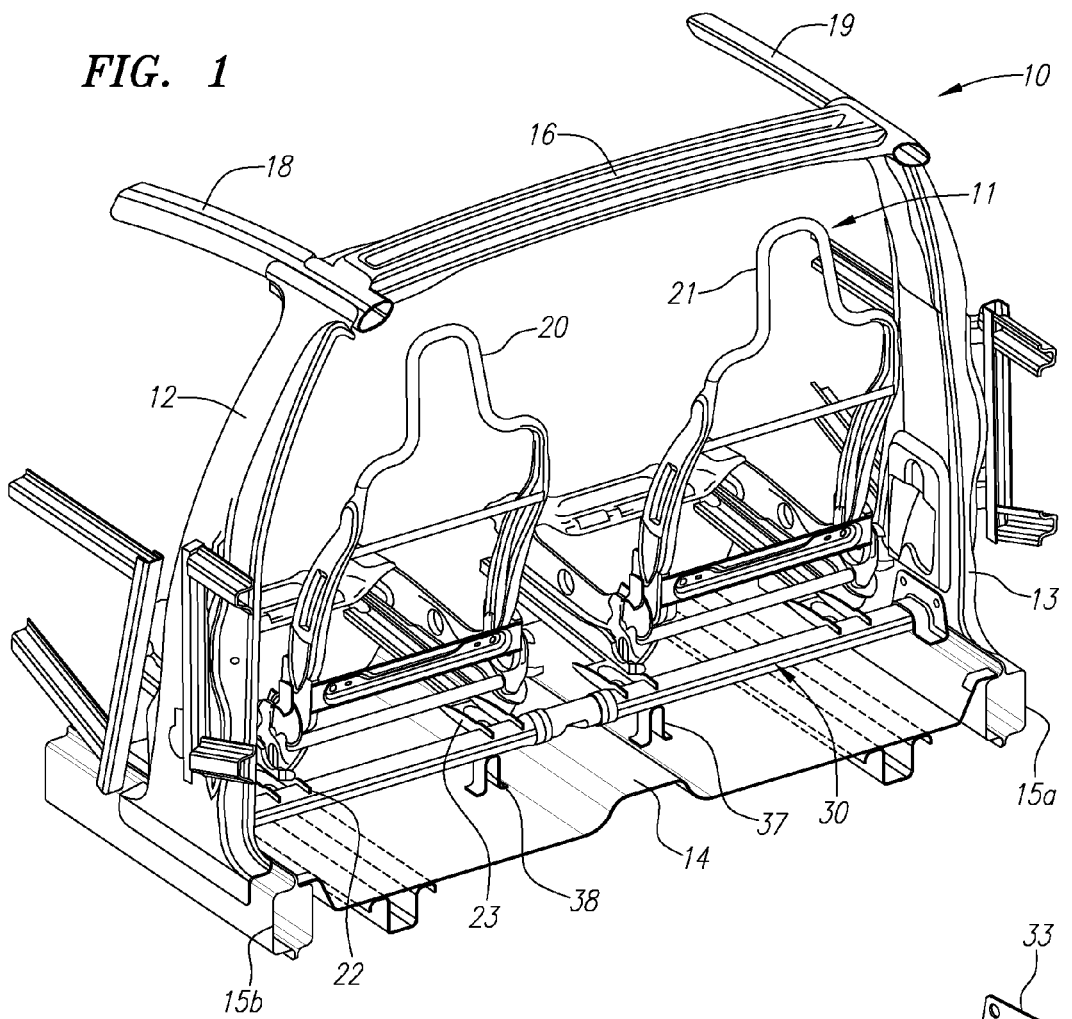
FIG. 1 is a rear perspective view of a partial vehicle body structure with a deformable cross-car beam system for side impact protection.
Figure 1A:
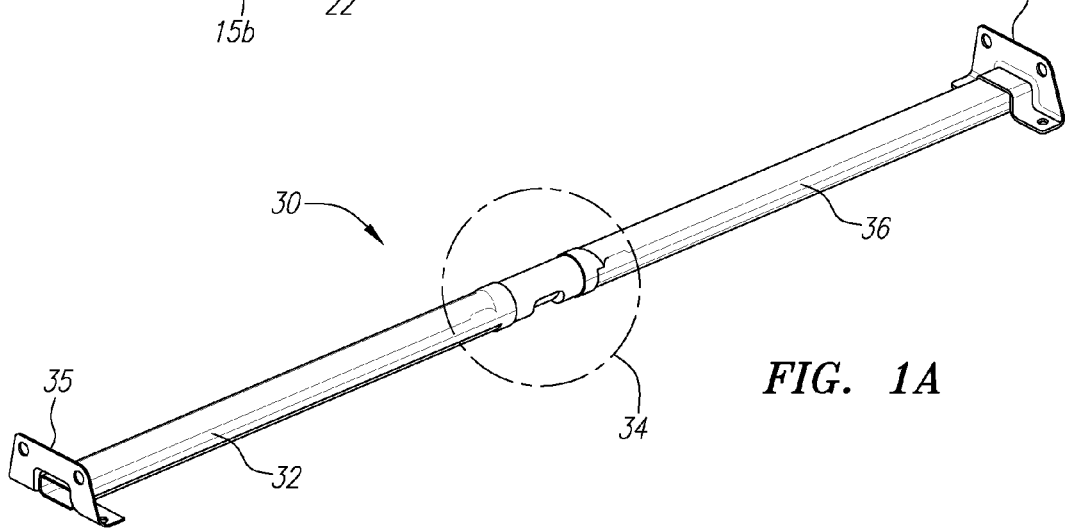
FIG. 1A is a perspective view of a deformable cross-car beam shown in FIG. 1.
Figure 2:
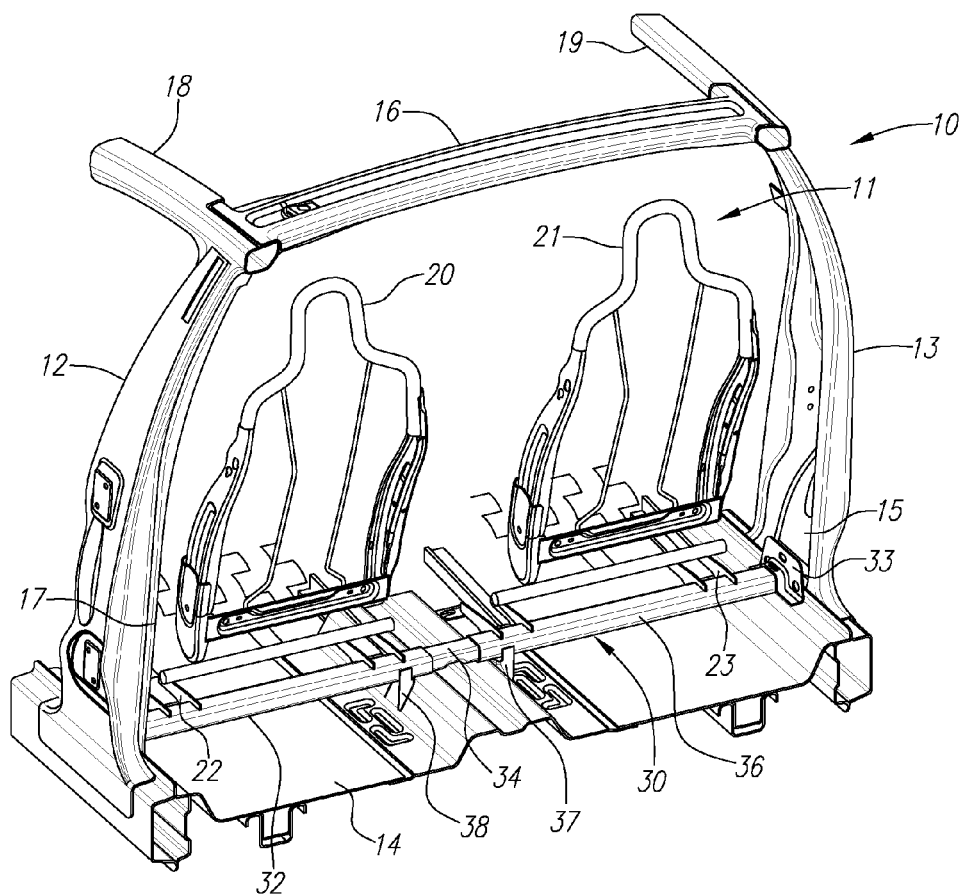
FIG. 2 is another rear perspective view of the partial vehicle body structure with a deformable cross-car beam system shown in FIG. 1.

Turning in detail to the figures, a preferred embodiment of a deformable cross-car beam system including a deformable tube 30 assembly is illustrated in FIGS. 1, 1A and 2. FIGS. 1 and 2 provide a rear perspective view of a partial body structure 10 or partial BIW defining a passenger compartment 11. As depicted, the passenger compartment 11 is defined by opposing vertical side structures or vehicle B-pillars 12 and 13 extending from outer frame rails 15a and 15b of an under body structure coupled, a floor pan 14 coupled to and extending between outer frame rails 15a and 15b, opposing roof side rails 18 and 19 coupled to and extending from the B pillars 12 and 13, and a roof cross-bar 16 coupled to the roof side rails 18 and 19 at the B-pillars 12 and 13 and extending there between. Left and right seat structure assemblies 20 and 21 are positioned within the passenger compartment.

Figure 3:
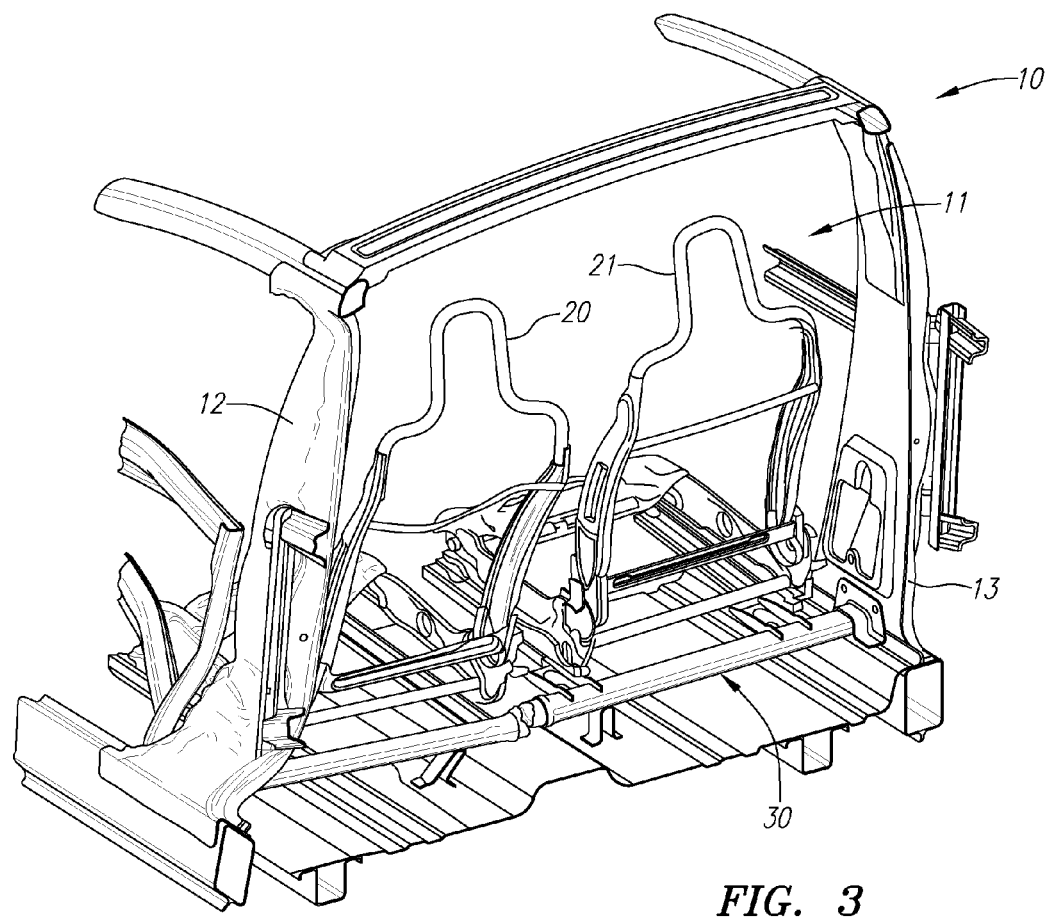
FIGS. 3 and 3A are perspective views of the deformable cross-car beam system and deformable cross-car beam shown in FIGS. 1 and 1A following a side impact event.
Figure 3A:
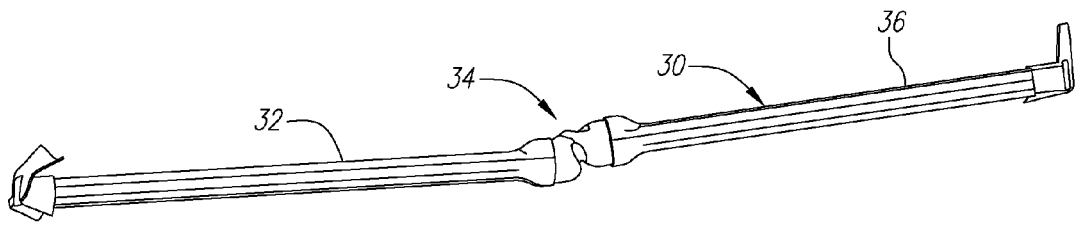
Figure 4:
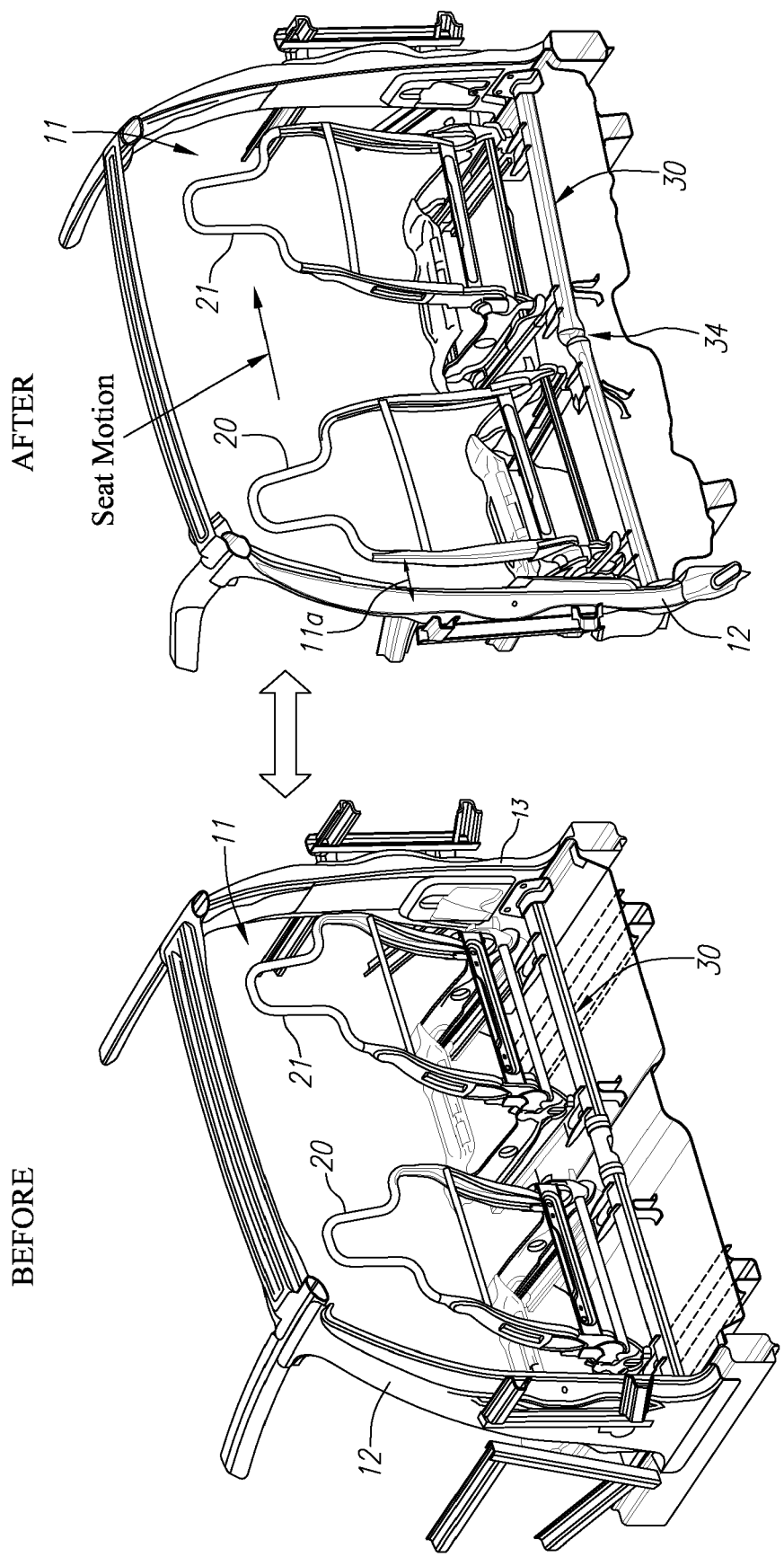
FIG. 4 provides before and after side impact event perspective views of the deformable cross-car beam system shown in FIG. 1.
Figure 5A:
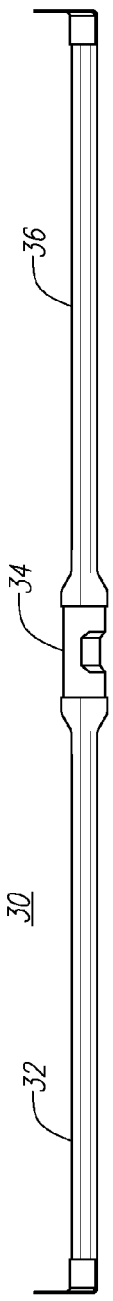
FIG. 5A through D show before and after side impact event plan views of the deformable cross-car beam tube shown in FIG. 1A.
Figure 5B:
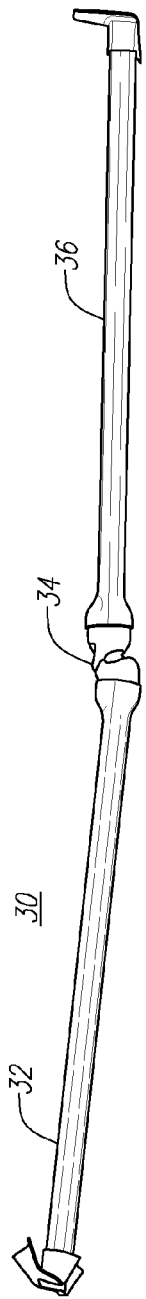
Figure 5C:
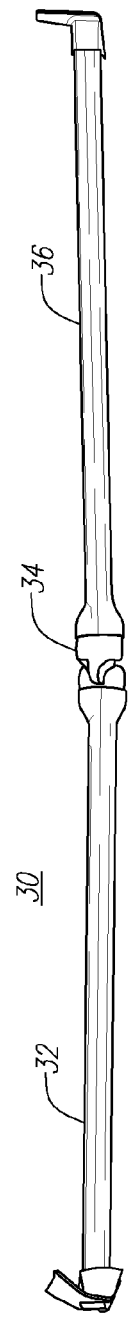
Figure 5D:
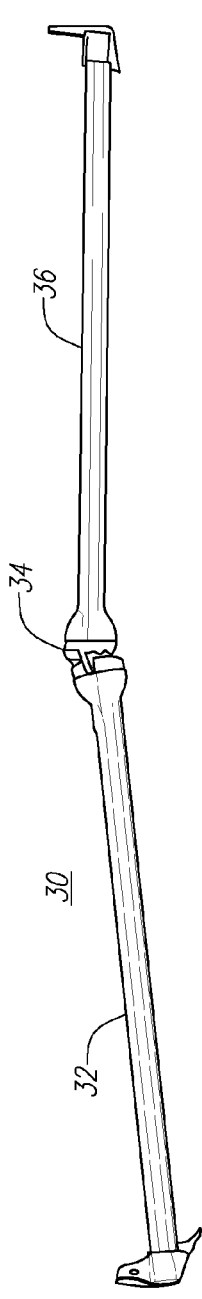

The deformable tube assembly 30, which as shown in more detail in FIG. 1A, includes first and second co-extensive rigid side portions 32 and 36 and a deformable co-extensive central portion 34 or "crush-can" portion coupled between the side portions 32 and 36. The tube assembly 30 is joined to the vehicle BIW 10 at two locations on the inner structures of opposing B-pillars 12 and 13 using attachment flanges 35 and 33 and two points on the vehicle floor pan 14 using attachment brackets 38 and 37. The tube 30 is designed to provide B-pillar 12 and 13 attachment, rear seat structure assembly attachment at adjustment rails 22 and 23, and a deformable center portion 34 that deforms at axial cross car crash forces that are sustainable without deformation by the side portions 32 and 36. As depicted in FIGS. 3 and 4, this pre-determined deformation allows for the seat 20 to move inboard in a direction M away from the intruding vehicle side structure 12 during a side impact crash event. This enables an increased gap (survival space) 11A within the passenger compartment between the intruding structure 12 and the passenger in the seat 20 within the passenger compartment 11. Attachment brackets 38 and 37, which extend from the tube 30 to the vehicle's floor pan 14 are designed to allow axial cross car motion while restricting vertical motion.

Figure 6:
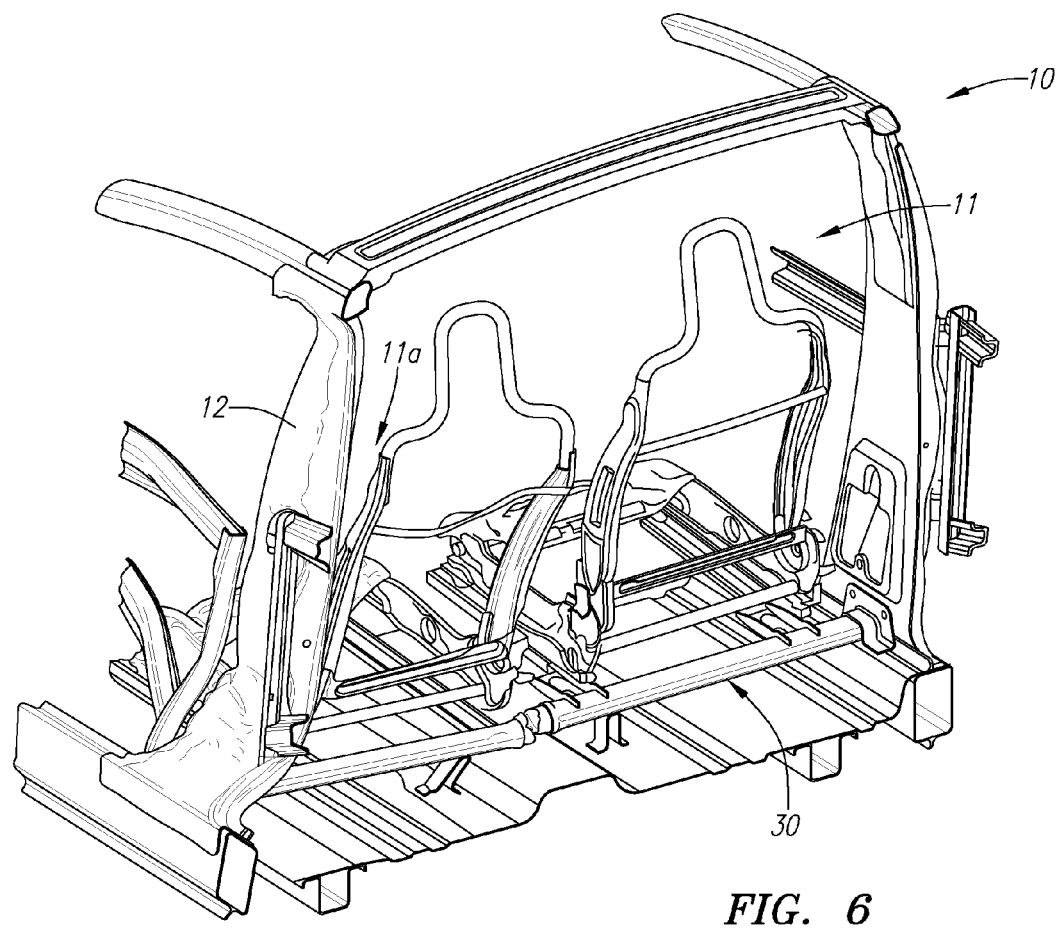
FIGS. 6 and 6A are perspective views of the deformable cross-car beam system and deformable cross-car beam shown in FIGS. 1 and 1A following an IIHS side impact event.
Figure 6A:
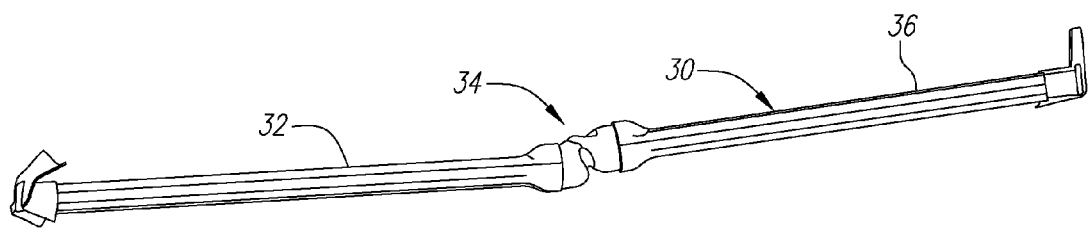
Figure 7:
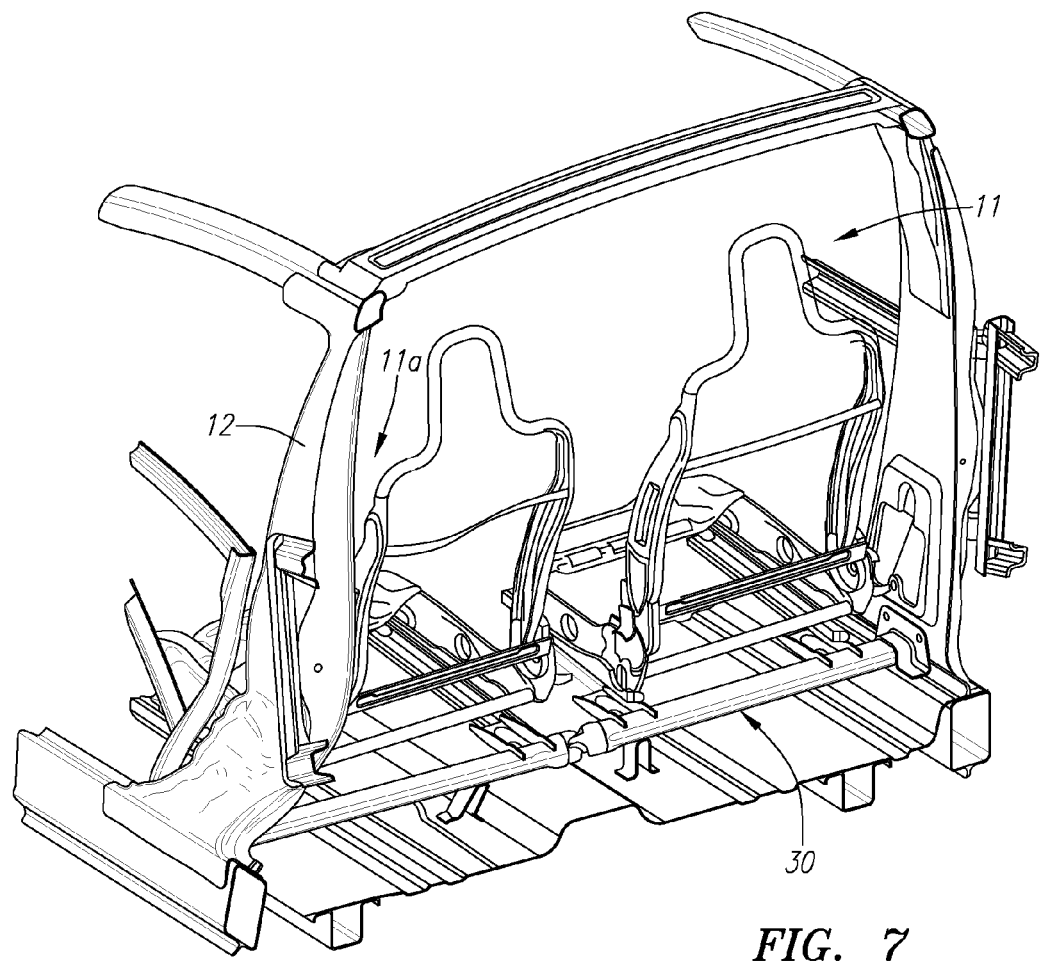
FIGS. 7 and 7A are perspective views of the deformable cross-car beam system and deformable cross-car beam shown in FIGS. 1 and 1A following a FMVSS214 dynamic side impact event.
Figure 7A:
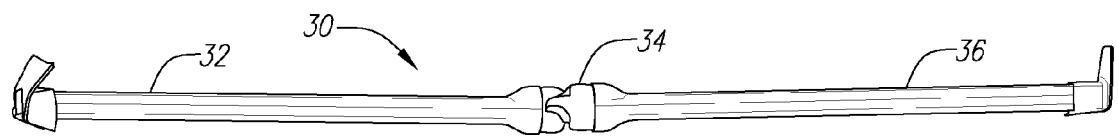
Figure 8:
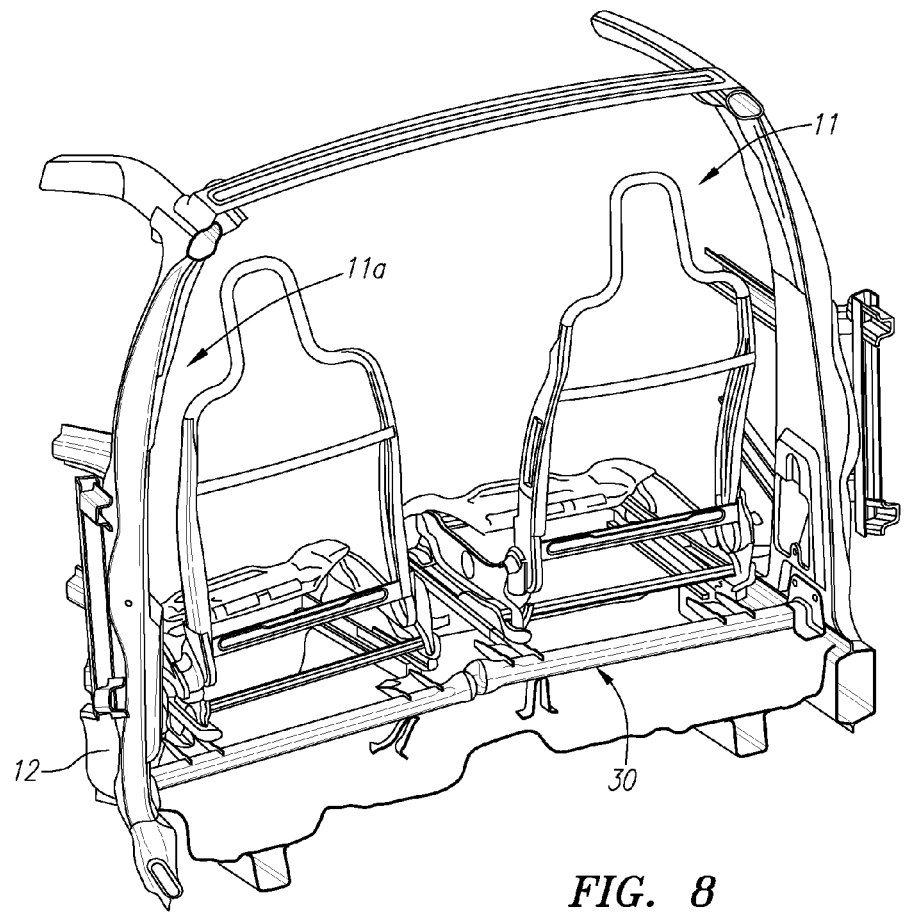
FIGS. 8 and 8A are perspective views of the deformable cross-car beam system and deformable cross-car beam shown in FIGS. 1 and 1A following an oblique pole side impact event.
Figure 8A:
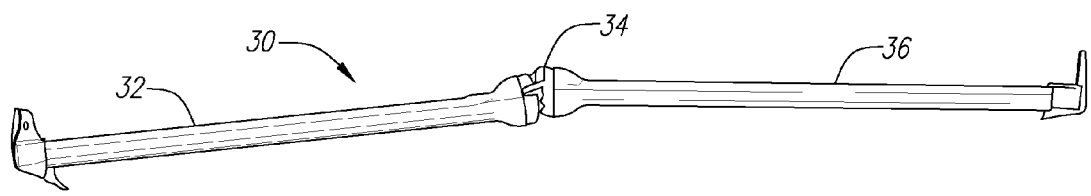

Referring to FIGS. 5A through D, the tube assembly 30 is illustrated in its intact, before impact configuration and its after impact, crushed configuration with the center portion 34 deformed from IIHS, FMVSS214 dynamic, and oblique pole type side impact events. Turning to FIGS. 6 through 8A, the vehicle body structure 10 and tube assembly 30 are illustrated following IIHS, FMVSS214 dynamic, and oblique pole type side impact events. The tube 30 is designed to absorb pressure from any type of accident that exerts pressure from either side on the tube assembly 30. After impact, each of FIGS. 5B through 8A shows compression of the crush can 34 upon external pressure exerted from the left side of the vehicle body structure 10. If there was external pressure from the right side of the vehicle body structure, the image would be mirrored. Both FIGS. 6 and 7 show external pressure from a 90 degree angle. FIG. 8 shows external pressure at a lesser angle, e.g., as if the vehicle slid into a telephone pole at an oblique angle.

The "after impact" angle of the side portions, in these instance the left side portion 32, of the tube 30 is a consequence of the angle at which the vehicle absorbed pressure. The side bars 32 and 36 are not limited to move in a certain way, just in response to compression of the crush can 34. In a preferred embodiment, the crush can is preferably approximately 100 mm wide and can preferably withstand compression in a range of approximately 15-20%.

In a preferred embodiment, the crush can or collapsible center portion 34 of the tube 30 assembly is formed from a material, such as steel, composite or the like, that is intended to crush under loads substantially lower than loads sustainable without deformation by the side portion tubes 32 and 36 extending from the B-pillars 12 and 13 to the center portion 34 of the tube 30 assembly. For example, in a preferred embodiment, the center deformable portion 34 of the tube 30 assembly is preferably formed from 24000 PSI steel and the side portion tubes 32 and 36 are preferably formed from high strength steel not intended to deform, e.g., die form 140 (140,000 PSI) to provide a configuration in which the center deformable portion 34 will crush under loads substantially lower that loads that are sustainable without deformation by the side portion tubes 32 and 36 extending from the B-pillars 12 and 13 to the center portion 34 of the tube 30.

Turning to FIGS. 9 through 15, a deformable cross-car beam system side impact protection system in accordance with an alternative embodiment is shown. FIG. 9 provides a rear perspective view of a partial body structure 100 or partial BIW defining a passenger compartment 111. As depicted, the passenger compartment 111 is defined by opposing vertical side structures or vehicle B-pillars 112 and 113 extending vertically from outer frame rails 115a and 115b of an under body structure, a floor pan 114 coupled to and extending between outer frame rails 115a and 115b, opposing roof side rails 118 and 119 coupled to and extending forward from the B pillars 112 and 113, a first roof cross-bar 116 coupled to the roof rails 118 and 119 at the B-pillars 112 and 113 and extending there between, and a second roof cross-bar 117 extending between the roof rails 118 and 119 in spaced relation with the first roof cross-bar 116. Left and right seat structure assemblies 120 and 121 are positioned within the passenger compartment 111.

The deformable cross-car beam system includes a controllably deformable cross beam 130 extending between and coupling to the outer frame rails 115a and 115b at the B-pillars 112 and 113. Left and right seat rail connectors 122, 123, 124 and 125 are used to couple the left and right seat structure assemblies 120 and 121 to the deformable cross beam 130, which is shown in more detail in FIGS. 10, 11A and 11B.

The cross beam 130 includes an elongate body 132 having top and side walls 141 and 142 forming a C-shape cross-sectional profile 140a or a hat shape cross-sectional profile 140b with chamfered corners. An elongate stiffening bead 131 in the form of a cavity or groove extending axially along the longitudinal axis of the body 132 is formed in the top wall 141. The cross beam 130 includes flanged ends 133 and 135 to attach to the outer frame rails 115a and 115b at the B-pillars 112 and 113.

The body 132 of the deformable cross beam 130 is designed to include multiple tunable deformation zones along its length using changes in surface geometry and/or changes in material to initiate controlled deformation under a load due to an impact to the side of the vehicle. The body 132 of the deformable cross beam 130 can be formed from a single material through a sheet metal forming process or the like where changes in the surface geometry determine where and how the body 132 of the cross beam 130 will deform. The change or changes in geometry create areas of varying strength and properties by their unique and tunable structural section properties. Examples of geometry that can be implemented to manage the deformation include grooves (both stiffening and controlled deformation initiators). In addition to varying sectional properties the deformable cross beam can be developed from multiple materials that are joined prior to the part being formed or as a part of the vehicle assembly process. The changes in material along the beam 30 determines where and how the body 132 of the cross beam 10 will deform. The body 132 of the deformable cross beam 130 is preferably designed to deform or buckle at the deformation zones in an accordion fashion. Where the body 132 of the deformable cross beam 130 includes two or more deformable zones per side or longitudinal half of the body 132 along its length, the deformation zones are preferably tunable to enable sequential deformation of the body 132.

Turning in detail to FIG. 10, the body 132 of the deformable beam 130 includes a central region 138 used to attach vehicle electronics between the seat assemblies 120 and 121, and first and second side sections 137 and 139 extending outwardly from the central region 138. Seat assembly mounting points or locations include side mounting points 126 and 129 located adjacent the flanged ends 133 and 135 and central mounting points 127 and 128 located adjacent the central region 138 of the body 132. As shown, the body 132 includes first and second transverse beads 134 and 136 in the form of a cavity, groove or other depression in the surface of the body 132 that create first and second deformation zones along the body 132. Although shown as symmetrically disposed on either side of the mid-plane of the body 132 along its longitudinal axis and transversing the longitudinal axis parallel to the mid-plane of the body 132, the first and second transverse beads 134 and 136 can be asymmetrically disposed and oriented at any angle relative to the mid-plane of the body 132 that accomplishes a desired deformation. However, the first and second transverse beads 134 and 136 are preferably located inside of or closer to the longitudinal mid-plane of the body 132 than the central seat assembly mounting points 127 and 128.

Figure 12:
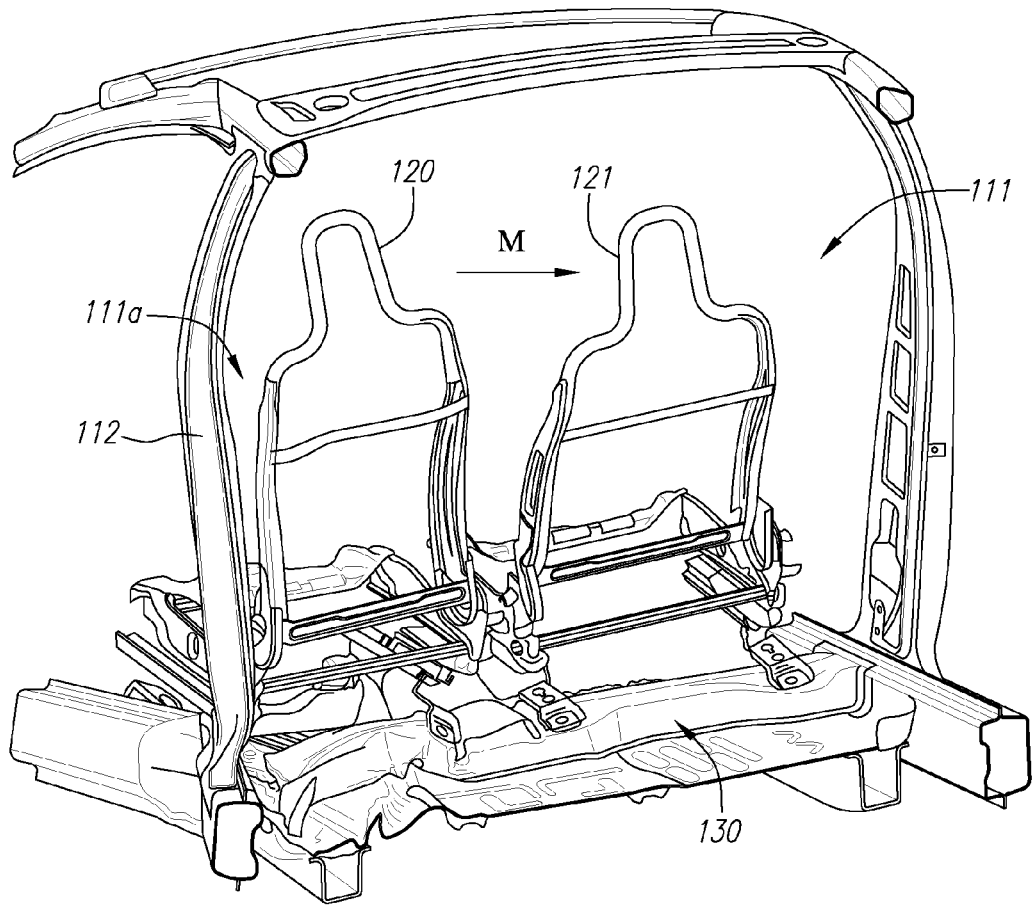
FIGS. 12 and 13 are perspective views of the deformable cross-car beam system and deformable cross-car beam shown in FIGS. 9 and 10 following a side impact event.
Figure 13:
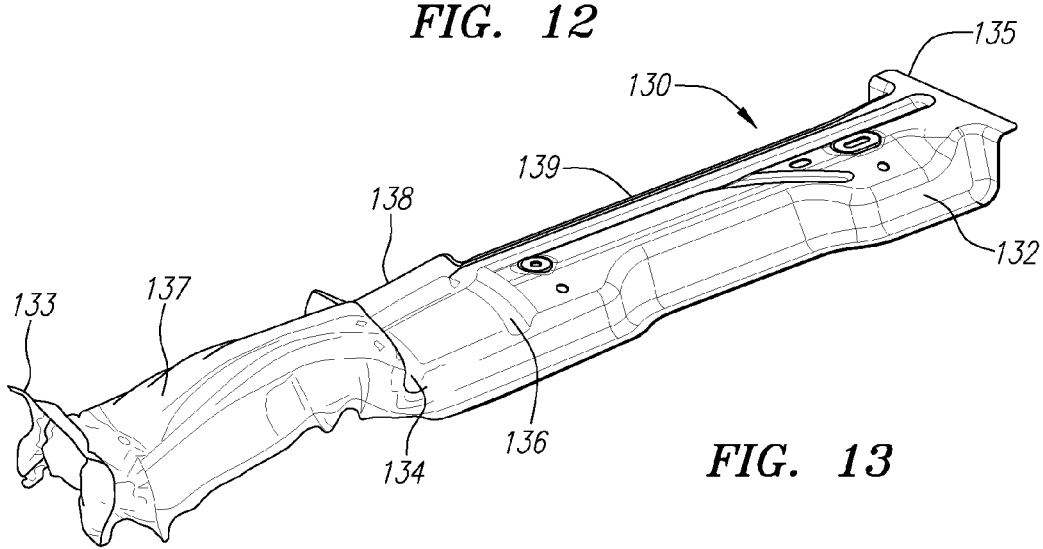

As depicted in FIGS. 12 and 13, the configuration of the body 132 of the deformable cross beam 132 described above causes the seat assembly 120 to move inboard in the direction M within the passenger compartment 111 away from the intruding vehicle side structure 112 during a side impact crash event as the body 132 of the deformable cross beam 130 deforms or buckles in the deformation zone created by the first transverse bead 134. This enables an increased gap (survival space) 111A within the passenger compartment 111 between the intruding structure 112 and the passenger in the seat of seat assembly 120.

As depicted in FIGS. 12 and 13, the body 132 of the deformable cross beam 130 is shown to have buckled or deformed in the deformation zone created by the first transverse bead 134 and at other areas along the length of the left half 137 of the body 132. Preferably, the deformation zone created by the first transverse bead 134 is tuned to deform or buckle first or before other deformable locations along the body 132 in response to a side impact.

If there was external pressure to the right side of the vehicle body structure due to a side impact, the image in FIG. 12 would be mirrored.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

The invention claimed is:

1. A vehicle comprising
a body understructure including first and second side rails,
first and second side structures extending upwardly from the understructure on opposing sides of the understructure, and
a cross beam coupled to and extending between the first and second side structures, the cross beam includes a configuration to deform axially inwardly in response to a crash force applied to the first or second side structures, wherein the cross beam includes an elongate body having one or more deformable regions being deformable under axial loads sustainable by other regions of the elongate body without deformation, wherein the one or more deformable regions comprise first and second grooves or depressions formed in the body on opposing sides of a longitudinal mid-plane of the body, wherein the first and second grooves or depressions are positioned closer to the longitudinal mid-plane than seat assembly connection points along the length of the elongate body.

2. The vehicle of claim 1 wherein the body has a C or hat shape profile.

3. A method for passenger protection during side impact events involving vehicle having a passenger compartment comprising first and second under structure side rails, a floor pan extending between first and second understructure side rails, first and second side structure extending vertically from the first and second under structure side rails, a cross-car beam extending between first and second side structures, and first and second seat assemblies coupled to the cross-car beam, comprising the steps of
deforming one or more deformable regions of the cross-car beam in response to axial forces exerted on the cross-car beam from a side impact event, wherein the deformable regions comprise first and second groves or depressions and
moving one of the first and second seat assemblies inward toward the center of the passenger compartment.

4. The method of claim 3 wherein the cross beam includes an elongate body having said one or more deformable regions being deformable under axial loads sustainable by other regions of the elongate body without deformation.

5. The method of claim 4 wherein the grooves or depressions are formed in the body on opposing sides of a longitudinal mid-plane of the body, wherein the grooves or depressions are positioned closer to the longitudinal mid-plane than seat assembly connection points along the length of the elongate body.

6. The method of claim 3 wherein the body has a C or hat shape profile.

* * * * *

UNITED STATES PATENT AND TRADEMARK OFFICE
CERTIFICATE OF CORRECTION

PATENT NO. : 8,079,635 B2  
APPLICATION NO. : 12/732033  
DATED : December 20, 2011  
INVENTOR(S) : Michael DeVor et al.

Page 1 of 1

It is certified that error appears in the above-identified patent and that said Letters Patent is hereby corrected as shown below:

On the Title Page:
Item (75) in the list of inventors, delete "Varansano" and insert -- Varasano --.

Signed and Sealed this
Fourteenth Day of February, 2012

David J. Kappos
*Director of the United States Patent and Trademark Office*